Nov. 20, 1962
C. L. ROPPEL
3,064,996
CONVERTIBLE HITCH APPARATUS FOR PLURAL TRAILING UNITS
Filed Sept. 22, 1961
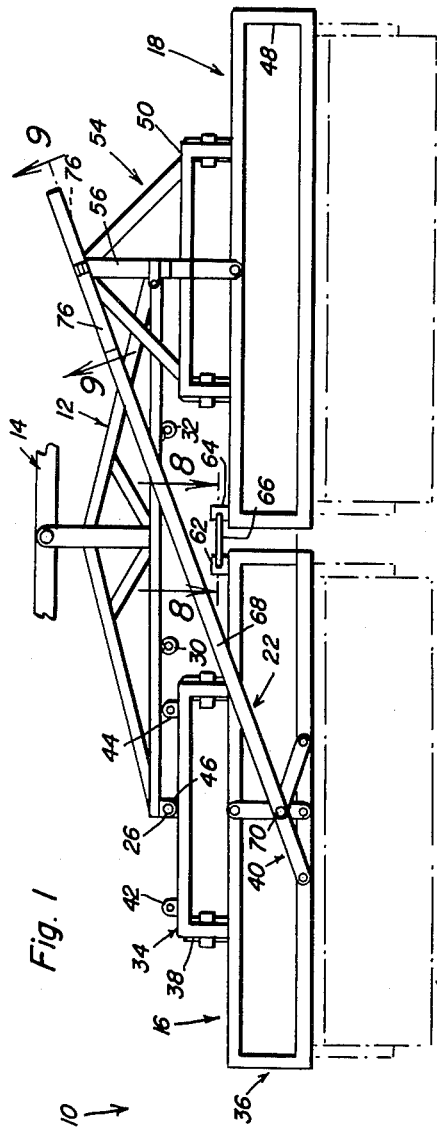
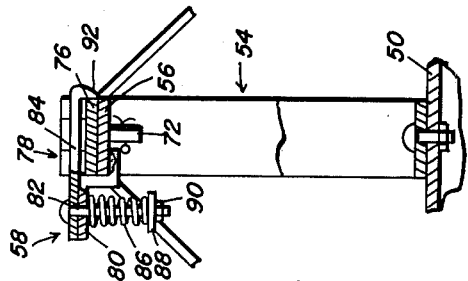
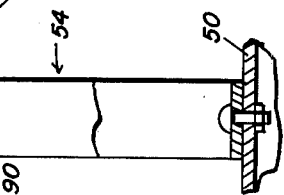
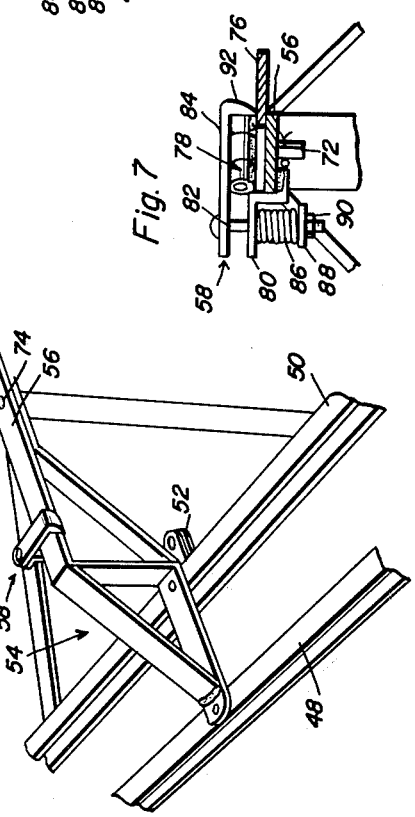
Clarence L. Roppel
INVENTOR.
BY *Clarence A. O'Brien*
*and Harvey B. Jackson*
Attorneys Nov. 20, 1962 C. L. ROPPEL 3,064,996
CONVERTIBLE HITCH APPARATUS FOR PLURAL TRAILING UNITS
Filed Sept. 22, 1961 3 Sheets-Sheet 2
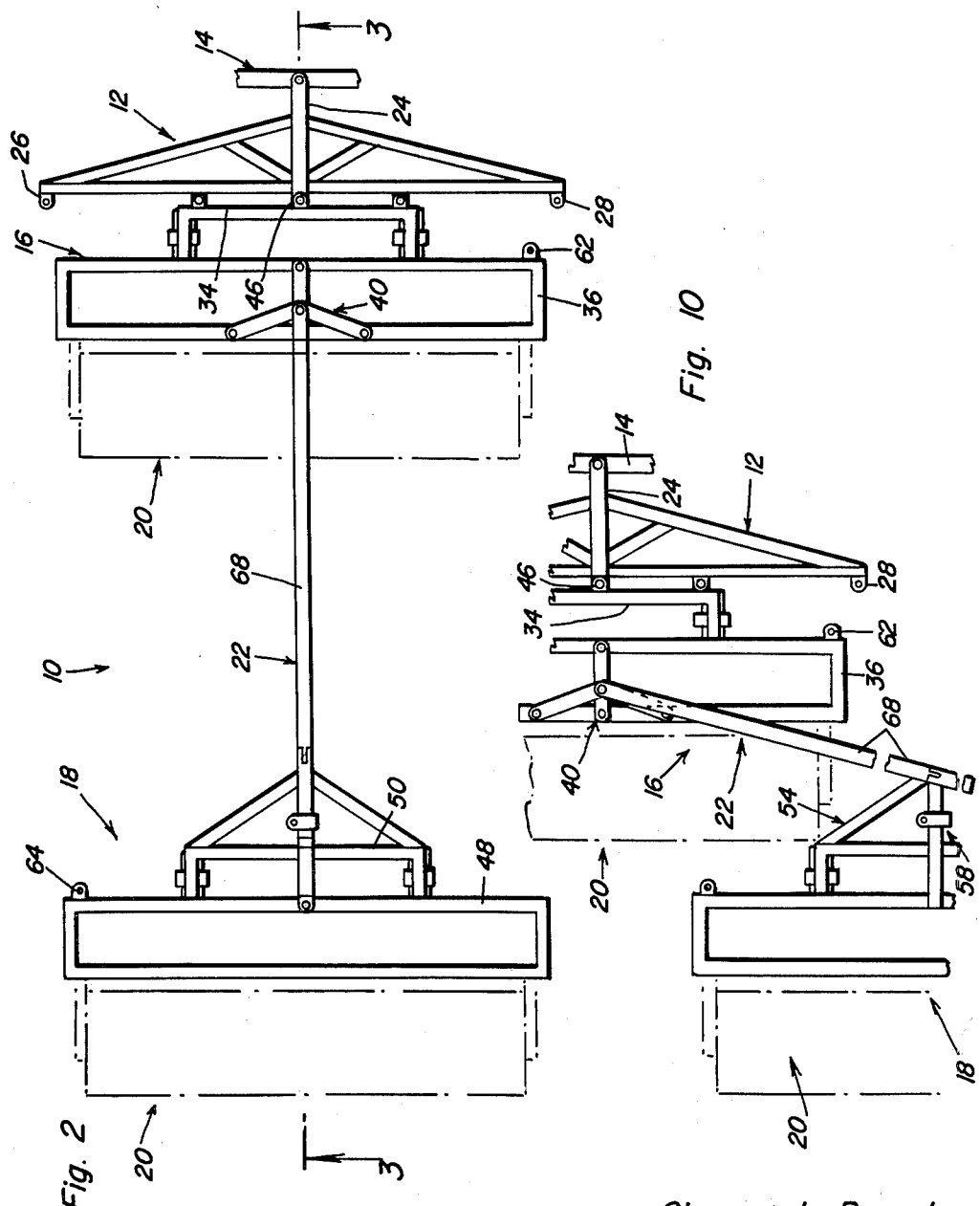
Clarence L. Roppel
INVENTOR.

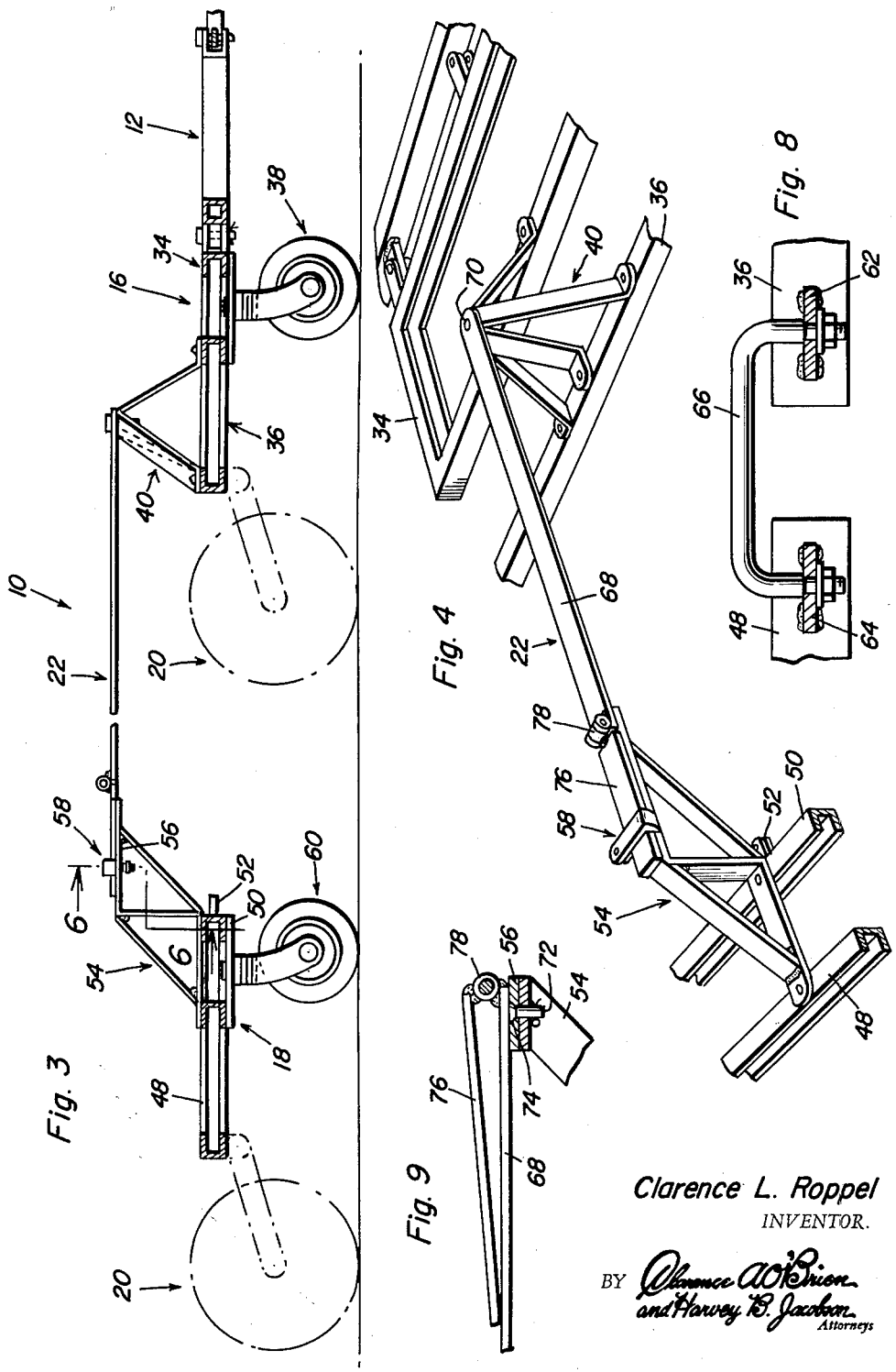

United States Patent Office 3,064,996
Patented Nov. 20, 1962

3,064,996
CONVERTIBLE HITCH APPARATUS FOR PLURAL TRAILING UNITS
Clarence L. Roppel, Fairdale, N. Dak.
Filed Sept. 22, 1961, Ser. No. 139,904
8 Claims. (Cl. 280—412)

This invention relates to a hitch assembly for a plurality of farm implements or the like each of which is adapted to be towed by a towing vehicle such as a tractor.

It is often desirable to tow a plurality of farm implements by a common towing vehicle in parallel spaced relation to each other. Often, the hitch apparatus must be also convertible so that the implements may be interconnected in alined tandem relation for purposes of towing the interconnected farm implements along narrow roads. The hitching equipment necessary to achieve the aforementioned objectives, has accordingly been quite complicated, massive and difficult to handle. Considerable effort has therefore been required when converting the hitching apparatus and also for removal of the hitching apparatus or connection thereof to the towing vehicle and implements to be towed. It is therefore a primary object of the present invention, to provide convertible type of plural unit hitch equipment that may be connected, disconnected and converted more easily and handled in general without the difficulties heretofore encountered.

Another object of this invention is to provide convertible type of hitch apparatus for plural trailing implements that may be handled by a single person to either tow a plurality of implements in parallel spaced relation to each other or in alined tandem relation to each other.

A further object of this invention is to provide a convertible hitch assembly that may be moved from a parallel spaced coupling condition to an alined tandem coupling position and which will automatically lock into a rigid assembly when moved to the alined tandem coupling position.

An additional object of this invention is to provide a convertible hitch assembly which features a novel interconnecting link arrangement which is effective to render the assembly rigid for both the parallel spaced towing arrangement and the alined tandem towing arrangement and also guide movement of the components of the hitch assembly between each of the aforementioned towing arrangements. Handling of the hitch assembly is thereby greatly facilitated.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of the hitch assembly of the present invention in its parallel spaced towing arrangement.

FIGURE 2 is a top plan view of the hitch assembly in its alined tandem towing arrangement.

FIGURE 3 is a sectional view taken substantially through a plane indicated by section line 3—3 of FIGURE 2.

FIGURE 4 is a partial perspective view of the hitch assembly in its alined tandem towing arrangement.

FIGURE 5 is a partial perspective view of the disassembled parts forming the lock mechanism of the present invention.

FIGURE 6 is a partial perspective view taken substantially through a plane indicated by section line 6—6 in FIGURE 3, showing the lock mechanism in engaged condition.

FIGURE 7 is a partial perspective view similar to that of FIGURE 6 showing the lock mechanism just prior to being engaged.

FIGURE 8 is a partial perspective view taken through a plane indicated by section line 8—8 in FIGURE 1.

FIGURE 9 is a partial perspective view taken through a plane indicated by section line 9—9 in FIGURE 1.

FIGURE 10 is a partial top plan view of the hitch assembly being displaced between its two towing arrangements as respectively illustrated in FIGURES 1 and 2.

Referring now to the drawings in detail, attention is initially invited toward FIGURES 1 and 2 wherein the hitch assembly of the present invention is illustrated in both of its towing arrangements. The hitch assembly is generally referred to by reference numeral 10 and includes a common towing hitch frame generally referred to by reference numeral 12 that is adapted to be pivotally connected in any suitable manner to a rear frame portion 14 of a towing vehicle. The hitch assembly further includes a plurality of coupling units two of which are shown, it being understood of course that any practical number of such coupling units may be arranged in association with a common hitch frame pursuant to the principles of the present invention. The coupling units will include however at least one forward coupling unit generally referred to by reference numeral 16 which may be coupled to the hitch frame 12 for movement both in parallel spaced relation to the other coupling units or as the lead coupling unit when the hitch assembly is conditioned for towing in the alined tandem arrangement of FIGURE 2. The coupling units will therefore also include at least one rear coupling unit generally referred to by reference numeral 18 which may be coupled to the hitch frame 12 for towing movement in parallel spaced relation to the other coupling units and also as the last trailing unit when the hitch assembly is conditioned for alined tandem towing purposes. Each of the coupling units is therefore adapted to be connected in any suitable manner to some type of farm implement as indicated by dotted lines in FIGURES 1 and 2 and referred to by reference numeral 20. Finally, the hitch assembly 10 includes an interconnecting link mechanism generally referred to by reference numeral 22 by means of which the hitch assembly is rendered rigid in both of its towing arrangements.

The hitch frame 12 is made in any suitable manner for support in spaced relation above the ground between the coupling unit and the towing vehicle frame as more clearly seen in FIGURE 3. The hitch frame 12 therefore includes a forwardly projecting frame member 24 by means of which the hitch frame is coupled to the towing vehicle on a drawbar for example attached to the towing vehicle. The hitch frame 12 is also provided with a plurality of spaced hinge projections that project rearwardly therefrom. The hinge projections include therefore drawpin hinge elements 26 and 28 disposed at the lateral ends of the hitch frame for disconnectible connection to each of the implement coupling units when they are arranged for towing in parallel spaced relation to each other as illustrated in FIGURE 1. The hitch frame is provided with more closely spaced hinge projections 30 and 32 as more clearly seen in FIGURE 1 for spaced connection to the forward coupling unit 16 as more clearly seen in FIGURE 2. It will therefore be appreciated, that by simple removal of the drawpin associated with each of the hinge projections 26, 28, 30 and 32, the hitch frame 12 may be connected for towing the implement coupling units in either of the towing arrangements.

The forward coupling unit 16 includes a hitch frame section 34 rigidly interconnected with and disposed forwardly of an implement frame section 36. The interconnected frame sections are supported in spaced relation above the ground for both towing movement and for guided movement between the two towing arrangements by means of a pair of laterally spaced caster wheel assemblies 38 swivelly mounted by the frame section 34 as more clearly seen in FIGURE 3. The frame section 36 on the other hand has mounted thereon centrally thereof, a guide bracket assembly 40 as more clearly seen in FIGURES 3 and 4, for the purpose of providing a pivotal connection to the coupling unit 16 in spaced relation above the frame section 36. Also, projecting forwardly from the hitch frame section 34, are a plurality of forwardly projecting hinge elements including the spaced hinge elements 42 and 44 that respectively cooperate with the hinge projections 30 and 32 on the hitch frame 12 for connection of the forward coupling unit 16 to the hitch frame when the hitch assembly 10 is arranged for alined tandem towing purposes. The frame section 34 of the coupling unit 16 also includes a centrally disposed forwardly projecting hinge projection 46 that cooperates with the hinge projection 26 on the hitch frame for connection thereto when the coupling units are in the parallel spaced towing arrangement.

The rear implement coupling unit 18 is similar in construction to the forward implement coupling unit in that it includes an implement frame section 48 and a hitch frame section 50 rigidly connected thereto and projecting forwardly therefrom. The frame section 50 however is only provided with the centrally disposed hinge projection 52 for purposes of connection to the hinge element 28 on the hitch frame 12. In the alined tandem towing arrangement it will be appreciated, the rear coupling unit 18 is not connected directly to the hitch frame 12 for which reason no spaced hinge projections are provided as described with respect to the coupling unit 16. Also, a guide bracket assembly 54 is mounted between the frame sections 50 and 48 of the coupling unit 18 which guide bracket 54 includes a pivot supporting member 56 as more clearly seen in FIGURE 5 disposed forwardly of the rear coupling unit 18 and spaced thereabove for pivotal connection to the interconnecting link mechanism 22. The pivot supporting member 56 is therefore suitably supported and braced by the bracket assembly 54. The bracket assembly 54 also mounts thereon a releaseable lock mechanism which is generally referred to by reference numeral 58 for cooperation with the interconnecting guide mechanism 22 as will be further explained hereafter. The rear implement coupling unit 18 is also provided with a pair of laterally spaced caster wheel assemblies 60 mounted below the forward frame section 50 for purposes similar to that described with respect to the forward coupling unit 16. It will be further observed, that the coupling units are respectively provided adjacent one of the lateral sides on the rear frame sections 36 and 48 with apertured projections 62 and 64 whereby adjacent coupling units when arranged in parallel spaced relation as illustrated in FIGURE 1, may be disconnectibly coupled by a unit coupling clevis element 66 as more clearly seen in FIGURE 8.

When the coupling units are in their parallel spaced arrangement, they may be coupled to the hinge projections 26 and 28 on the hitch frame for towing purposes and also interconnected by the clevis element 66. In this latter arrangement, the coupling units are further interconnected to form a rigid assembly by means of the interconnecting guide link mechanism 22 which includes a connecting bar member 68. The connecting bar 68 is pivotally connected at one end 70 to the bracket assembly 40 mounted on the forward coupling unit 16. The other end of the connecting bar 68 as more clearly seen in FIGURE 9, has a downwardly projecting pin 72 connected thereof for reception within the aperture 74 on the pivot supporting member 56 of the bracket assembly 54 of coupling unit 18. The connecting bar member 68 is thereby pivotally connected to both the coupling units 16 and 18 so that when the coupling units are uncoupled from the hitch frame 12 they may be pivotally displaced with respect to each other as indicated in FIGURE 10. The lock mechanism 58 is therefore mounted on the bracket assembly 54 for the purpose of locking the coupling units in alined tandem relation to each other when the coupling units are no longer connected in common to the hitch frame.

The connecting bar 68 of the interconnecting link mechanism 22 as hereinbefore indicated will guide movement of the coupling units relative to each other between the towing arrangements illustrated in FIGURES 1 and 2. In order to lock the coupling units in their alined tandem relation, a foldable latch bar 76 is hingedly connected by means of hinge 78 to the end of the connecting bar 68 adjacent to the pivot pin 72. Accordingly, when the coupling units are in the arrangement illustrated in FIGURE 1, the latch bar 76 may be folded down onto the connecting bar 68 as more clearly seen in FIGURE 9 in an out-of-the-way position. However, in order to lock the coupling units through the interconnecting link mechanism 22 in their alined tandem arrangement, the foldable latch bar 76 is extended as indicated by dotted lines in FIGURE 1 and in FIGURE 5 for engagement with the lock mechanism 58 on the bracket 54. Referring therefore to FIGURES 6 and 7 in particular, it will be observed that the pivot supporting member 56 has welded thereto rearwardly spaced from the pivot aperture 74, a lock supporting bracket 80 which is apertured for reception therethrough of a bolt member 82 by means of which a releaseable latch element 84 is pivotally mounted. The latch element 84 may also be displaced upwardly with its pivot bolt 82 against the bias of a spring element 86 that reacts between the latch support bracket 80 and a washer 88 mounted adjacent the bottom end of the bolt 82 on top of the nut 90. The latch element 84 is therefore provided with a downwardly directed cam surface 92 that is engageable by the side of the extended latch bar 76 so as to cam the latch element 84 upwardly against the bias of the spring element 86 as illustrated in FIGURE 7 when the connecting bar 68 is pivotally displaced in guiding the coupling units to the alined tandem relation. It will therefore be apparent, that when the coupling units approach the alined tandem relationship, the latch element 84 is displaced upwardly so that the extended latch bar 76 will be received above the pivot supporting member 56 of the bracket 54 and subsequently locked thereby as illustrated in FIGURE 6 to rigidly hold the coupling units in the alined tandem relationship through the interconnecting link bar 68. In order to release the coupling units from the alined tandem arrangement, it will only be necessary to upwardly displace the latch element 84 and pivotally swing it out of latching position.

From the foregoing description, operation and utility of the hitch assembly of the present invention will be apparent. It will therefore be apparent, that the hitch assembly when arranged as illustrated in FIGURE 1 will hold the implements 20 in parallel spaced relation for towing purposes. The hitch assembly may be converted from the arrangement shown in FIGURE 1 by merely uncoupling the hitch frame from the centrally disposed hitch projections 46 and 52 on the coupling units 16 and 18 and removing the clevis pin 66 by means of which the coupling units are interconnected with each other. The coupling unit 16 may then be displaced relative to the coupling unit 18 swinging in an arc about the pivot pin 72 by means of which the coupling unit 16 is pivotally connected to the coupling unit 18 through the connecting bar 68. In the meantime, the latch bar 76 is extended so that when the coupling unit 16 approaches an alined tandem position with respect to the coupling unit 18, the latch bar 76 will become latched by the lock mechanism 58 to rigidly hold the coupling units in their alined position as illustrated in FIGURE 2. The hitch frame 12 may then be recoupled to the forward coupling unit 16 at spaced locations for towing of the implements 20. In order to return the hitch assembly to the spaced parallel towing arrangement, it will be again necessary to uncouple the hitch frame from the forward coupling unit 16 and release the lock mechanism 58 whereupon the forward coupling unit 16 may be swung back to the parallel spaced position relative to the rear coupling unit 18. The clevis pin 66 may then be reinserted between the adjacent hinge projections 62 and 64 and the hitch frame 12 coupled through the centrally disposed hinge projections from the coupling units. The latch bar 76 may then be folded out-of-the-way as hereinbefore indicated.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A convertible hitch assembly for plural trailing implements adapted to be towed by a towing vehicle comprising, a plurality of implement coupling units disconnectibly coupled for towing movement in parallel spaced relation and aligned tandem relation to each other, common hitch means adjustably connectible to each of said implement coupling units for towing of said coupling units by the towing vehicle in parallel spaced relation, and guide link means operatively interconnecting said coupling units to form a rigid assembly of coupling units when all coupled to the hitch means and guide movement of said coupling units into a rigid assembly of coupling units in aligned tandem relation to each other when uncoupled from the hitch means and from each other, said guide link means comprising a connecting bar movably connected to each coupling unit and lock means operatively connected to said connecting bar and one of said coupling units rendered effective to releasably lock said connecting bar against further displacement relative to said coupling units in response to guided movement of said coupling units to a position in alined tandem relation to each other.

2. The combination of claim 1 wherein said lock means comprises a foldable latch member hingedly connected to the connecting bar for extension into locking engagement with a releasable latch element operatively mounted on one of said coupling units.

3. The combination of claim 2 wherein each of said coupling units comprises frame means, caster wheel means supporting said frame means above the ground for towing and guided movements, a disconnectible hitch connection projecting forwardly from the frame means and pivotally connectible to said hitch means, pivot bracket means mounted on the frame means and projecting upwardly thereabove for pivotal connection to the guide link means, and removable coupling means for coupling each coupling unit to an adjacent coupling unit for parallel spaced towing movement.

4. The combination of claim 3 wherein one of said coupling units includes additional spaced hitch connections projecting forwardly from the frame means thereof for connection to the hitch means.

5. The combination of claim 4 wherein said hitch means comprises a hitch frame having spaced draw connections projecting rearwardly therefrom for disconnectible connection to each of said coupling units at one location thereon and disconnectible connection to one of said coupling units at spaced locations thereon.

6. A convertible hitch assembly for plural trailing implements adapted to be towed by a towing vehicle comprising, a plurality of implement coupling units disconnectibly coupled for towing movement in parallel spaced relation and aligned tandem relation to each other, common hitch means adjustably connectible to each of said implement coupling units for towing of said coupling units by the towing vehicle in parallel spaced relation, and guide link means operatively interconnecting said coupling units to form a rigid assembly of coupling units when all coupled to the hitch means and guide movement of said coupling units into a rigid assembly of coupling units in aligned tandem relation to each other when uncoupled from the hitch means and from each other, said hitch means comprising a hitch frame having spaced draw connections projecting rearwardly therefrom for disconnectible connection to each of said coupling units at one location thereon and disconnectible connection to one of said coupling units at spaced locations thereon.

7. A convertible hitch assembly for plural trailing implements adapted to be towed by a towing vehicle comprising, a plurality of implement coupling units disconnectibly coupled for towing movement in parallel spaced relation and aligned tandem relation to each other, common hitch means adjustably connectible to each of said implement coupling units for towing of said coupling units by the towing vehicle in parallel spaced relation, and guide link means operatively interconnecting said coupling units to form a rigid assembly of coupling units when all coupled to the hitch means and guide movement of said coupling units into a rigid assembly of coupling units in aligned tandem relation to each other when uncoupled from the hitch means and from each other, each of said coupling units comprising frame means, caster wheel means supporting said frame means above the ground for towing and guided movements, a disconnectible hitch connection projecting forwardly from the frame means and pivotally connectible to said hitch means, pivot bracket means mounted on the frame means and projecting upwardly thereabove for pivotal connection to the guide link means, and removably coupling means for coupling each coupling unit to an adjacent coupling unit for parallel spaced towing movement.

8. The combination of claim 7 wherein one of said coupling units includes additional spaced hitch connections projecting forwardly from the frame means thereof for connection to the hitch means.

References Cited in the file of this patent

UNITED STATES PATENTS

| | | |
|---|---|---|
| 2,139,200 | Moyer | Dec. 6, 1938 |
| 2,178,467 | Brent | Oct. 31, 1939 |
| 3,008,732 | Raney | Nov. 14, 1961 |